UNITED STATES PATENT OFFICE 2,647,896

SPIRO [CYCLOHEXANE-1,9'-FLUORENE] AMINES

Dale A. Stauffer and Otis E. Fancher, Elkhart, Ind., assignors to Miles Laboratories, Inc., Elkhart, Ind., a corporation of Indiana No Drawing. Application April 11, 1952,
Serial No. 281,902

6 Claims. (Cl. 260—247)

This invention relates to a new class of physiologically active amines. The invention also relates to a novel intermediate from which such amines are produced.

The new amines comprising our invention can be represented by the general formula:

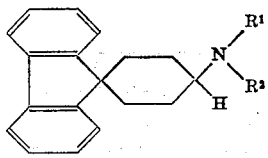

In the above formula $R^1$ is a radical selected from the group consisting of hydrogen, alkyl, chloroalkyl and hydroxyalkyl radicals; $R^2$ is a radical selected from the group consisting of hydrogen and alkyl radicals; the amino moiety

may also be in the form of a heterocyclic radical such as morpholine, piperidine, piperazine, pyrrolidine alkyl substituted heterocyclic amines, tetrahydroquinoline and tetrahydroisoquinoline.

The novel amines of our invention have been found to possess valuable therapeutic properties as hypotensives.

The amines of our invention may be prepared from spiro[cyclohexane-1,9'-fluorene]-4-one via the Leuckart reaction as exemplified below:

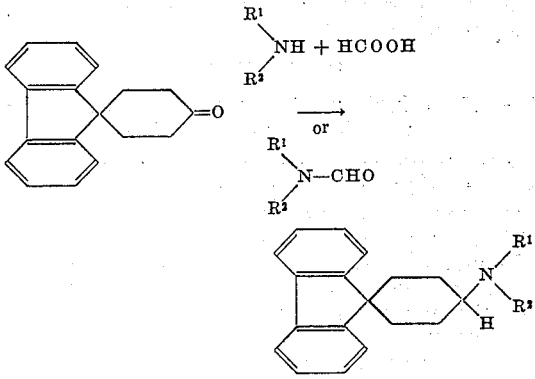

or by catalytic reductive alkylation:

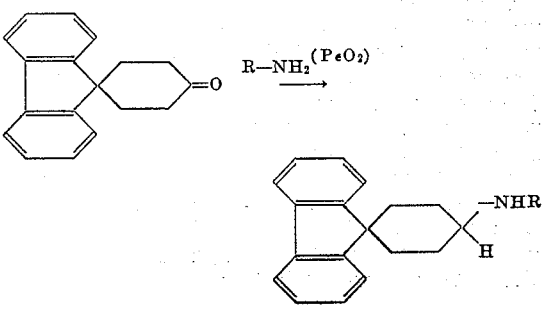

Spiro[cyclohexane-1,9'-fluorene]-4-one employed as an intermediate for the preparation of our amines may be prepared, for example, by either of the following two illustrative procedures:

A. *Preparation of spiro[cyclohexane-1,9'-fluorene]-4-one from dimethyl 9,9-fluorene-dipropionate*

Dimethyl 9,9-fluorenedipropionate (253.5 g., 0.75 mole), commercial sodium methoxide (81.0 g., 1.5 moles) and 800 ml. of dry toluene were stirred under a nitrogen atmosphere and heated in an oil bath at 105–110° (bath temperature). After heating for about ninety minutes the mixture suddenly solidified almost completely. The reaction flask was cooled in an ice bath, while 150 ml. of glacial acetic acid was added with stirring. Then a mixture of 50 ml. of concentrated hydrochloric acid and 500 ml. of water was added and the stirring was continued until all of the solid material had been decomposed. The organic layer was separated and washed free of acidic materials with a 10 per cent aqueous solution of sodium bicarbonate. The toluene solution was dried over calcium chloride and the solvent was removed by distillation. The pink solid residue was recrystallized from a mixture of acetone and methanol, the hot solution being clarified with Norite. The 3-carbomethoxy-spiro[cyclohexane-1,9'-fluorene]-4-one was obtained as colorless crystals (205 g., 90 per cent), M. P. 122–3°.

*Anal.*—Calc'd for $C_{20}H_{18}O_3$: C, 78.41; H, 5.92. Found: C, 78.35; H, 6.19.

3-carbomethoxyspiro[cyclohexane-1,9'-fluorene]-4-one (10.0 g.) was heated under reflux for six hours with a mixture of 50 ml. of glacial acetic acid and 25 ml. of concentrated hydrochloric acid. The hot solution was decanted from the sticky insoluble material and poured with stirring onto 200 g. of cracked ice. The residue in the reaction flask was taken up in 10 ml. of hot acetic acid and the solution was added to the cold mixture. The crude ketone was collected, washed with water and dried. The light yellow material amounted to 8.1 g., M. P. 190–200°. The crude product was taken up in hot ethanol and the solution was clarified with Norite. Upon cooling the solution deposited 6.7 g. (83 per cent) of the almost colorless spiro[cyclohexane-1,9'-fluorene]-4-one, M. P. 198–202°. After two additional recrystallizations from isopropanol the colorless analytical sample melted at 209–210°.

*Anal.*—Calc'd for $C_{18}H_{16}O$: C, 87.06; H, 6.50. Found: C, 86.63; H, 6.52.

B. *Preparation of spiro[cyclohexane-1,9'-fluorene]-4-one from 9,9-fluorenedipropionitrile*

Metallic sodium (12.7 g., 0.55 mole) and potassium (1.3 g.) were covered with 1 liter of dry toluene. Precautions were taken to exclude moisture and the mixture was warmed under a nitrogen atmosphere until the metals fused. Then the mixture was stirred vigorously while it cooled. The finely divided metallic suspension was stirred at 80°, and a solution of 150 g. (0.55 mole) of 9,9-fluorene dipropionitrile in 300 ml. of dry toluene was added. The mixture was kept at 80-85° with continued stirring for four hours. The stirring was continued and 150 ml. of ethanol was added to the mixture. After all of the unreacted sodium and potassium had been destroyed the mixture was cooled in an ice bath, while 700 ml. of water was added with stirring. The mixture was filtered with suction, and the solid material was washed thoroughly with water. The crude 3-cyano-4-imino-spiro[cyclohexane-1,9'-fluorene] amounted to 120 g. (80 per cent), M. P. 261-4°. An analytical sample was obtained as fine colorless needles, M. P. 264-5°, after two recrystallizations from fusel oil.

Anal.—Calc'd for $C_{19}H_{16}N_2$: N, 10.29. Found: N, 10.31.

3 - cyano - 4 - iminospiro[cyclohexane-1,9'-fluorene], (83.3 g.) was dissolved in a hot mixture of 500 ml. of glacial acetic acid and 25 ml. of water. The hot solution was clarified with Norite and poured onto 1 kg. of cracked ice. After the ice had melted the almost colorless solid material was collected and washed thoroughly with water. The solid material was heated to boiling for ten minutes with 500 ml. of water, and the hot mixture was filtered. The product was washed thoroughly with water. After drying at 100° under reduced pressure, the 3 - cyano - spiro[cyclohexane - 1,9' - fluorene]-4-one amounted to 80 g. (96 per cent), M. P. 184-6°.

Anal.—Calc'd for $C_{19}H_{15}ON$: N, 5.13. Found: N, 5.06.

3 - cyanospiro[cyclohexane - 1,9' - fluorene]-4-one (50.0 g. was dissolved in 500 ml. of hot methanol and anhydrous hydrogen chloride was passed into the solution at a moderate rate for thirty minutes. Crystals soon began to separate out. The mixture was kept near the boiling point for another hour while the gaseous hydrogen chloride was slowly introduced. After cooling, the colorless crystals (52.0 g.) were collected and washed with methanol.

The product was heated under reflux for forty-eight hours with 500 ml. of glacial acetic acid and 200 ml. of concentrated hydrochloric acid. Most of the acetic acid was removed by distillation and the residue was mixed with one kilogram of ice and water. The crude ketone was collected and washed thoroughly with hot water. The dry product amounted to 44.3 g., M. P. 185-195°. The material was taken up in hot ethanol and the solution was clarified with Norite. The hot solution was treated with a hot solution of 16.3 g. of thiosemicarbazide in 400 ml. of ethanol. The mixture was kept at the boiling point for thirty minutes. The mixture was allowed to cool and the thiosemicarbazone of spiro[cyclohexane - 1,9' - fluorene] - 4 - one was collected. The colorless crystals amounted to 29.5 g., M. P. 216-7°.

Anal.—Calc'd for $C_{19}H_{19}N_3S$: S, 9.98. Found: S, 9.84.

The thiosemicarbazone was heated under reflux with stirring for eighteen hours with 150 ml. of concentrated hydrochloric acid. The mixture was cooled and diluted with 500 ml. of water. The faintly yellow crystals (22.5 g., 50 per cent based on the 3-cyanospiro[cyclohexane-1,9'-fluorene]-4-one) melted at 195-200°. When mixed with an authentic sample of spiro[cyclohexane-1,9'-fluorene]-4-one, the melting point was not depressed.

While our amines may be prepared in the form of the free base, it is generally preferable to convert the base into a salt such as the hydrochloride. Other salts of the base may also be prepared by treating the base with a suitable acid to produce the sulfate, hydrobromide, phosphate, tartrate, citrate and the like. Quaternary salts of the base may also be prepared by treating the free base with an alkyl halide such as methyl chloride, methyl bromide, dimethyl sulfate, methyl iodide and similar quaternizing reagents, in known manner.

The following examples will serve to illustrate some of the preferred procedures for carrying out the invention.

EXAMPLE 1

4-(N-morpholinyl)-spiro[cyclohexane-1,9'-fluorene]hydrochloride

Spiro[cyclohexane-1,9'-fluorene]-4-one (9.92 g., 0.04 mole), morpholine (17.4 g., 0.2 mole), and formic acid (18.4 g., 0.4 mole) were heated in a wax bath, so that the volatile materials were allowed to distill through a 30 cm. Vigreux column. The bath temperature was raised gradually to 200°, and that temperature was maintained for one hour. Then the mixture was heated under reflux for four hours at a bath temperature of 250°. After the mixture had cooled somewhat, 50 ml. of water and 10 ml. of hydrochloric acid were added. The mixture was cooled in an ice bath and the precipitate was collected and dried. The faintly yellow crude hydrochloride (12.5 g.) was dissolved in hot aqueous methanol. The solution was treated with Norite, filtered and allowed to cool. The colorless crystals of 4-(N-morpholinyl)-spiro[cyclohexane-1,9'-fluorene]hydrochloride amounted to 11.5 g. (90 per cent), M. P. Ca, 340°.

Analysis: Calc'd for $C_{23}H_{26}NOCl$: Cl, 9.96. Found: Cl, 9.97.

EXAMPLE 2

4 - (B - hydroxyethylamino) - spiro[cyclohexane-1,9'-fluorene]hydrochloride.

Adam's platinum catalyst (0.2 g.) was suspended in 50 ml. of absolute ethanol and reduced to platinum by shaking in an atmosphere of hydrogen. A solution of spiro[cyclohexane-1,9'-fluorene]-4-one (9.92 g., 0.04 mole) and ethanolamine (2.14 g., 0.035 mole) in 50 ml. of hot absolute ethanol was rinsed into the catalyst suspension with another 50 ml. of the solvent. Hydrogen was introduced under 41.5 pounds pressure. After shaking for four hours, the theoretical quantity of hydrogen was taken up. The catalyst was filtered off and the solvent was removed by distillation. The solid residue was heated to boiling with 100 ml. of water and 15 ml. of hydrochloric acid, and the hot mixture was filtered. The residue was extracted with four additional 100 ml. portions of water. The combined extracts were cooled in an ice bath and the crystals were collected and dried. The crude hydrochloride (11.1 g.) was dissolved in a hot mixture of methanol and isopropanol; the solution was clarified with Norite and allowed to cool. The colorless crystals of 4-(B-hydroxyethylamino) - spiro[cyclohexane - 1,9' - fluorene]hydrochloride amounted to 9.2 g. (80 per cent), M. P. 290–1°.

Analysis: Calc'd for $C_{20}H_{24}ONCl$: Cl, 10.75. Found: Cl, 10.89.

EXAMPLE 3

*4 - (B - chloroethylamino) - spiro[cyclohexane-1,9'-fluorene]hydrochloride*

4 - (B - hydroxyethylamino) - spiro[cyclohexane-1,9'-fluorene]hydrochloride (8.0 g.) was mixed with 20 ml. of thionyl chloride. After the initial reaction was over, the mixture was heated under gentle reflux for three hours. The excess thionyl chloride was distilled off under reduced pressure and the residue was mixed with 100 ml. of dry ether. The crude hydrochloride was collected and dissolved in hot aqueous methanol; the solution was treated with Norite, filtered and allowed to cool. The 4-(B-chloroethylamino)-spiro[cyclohexane - 1,9' - fluorene]hydrochloride was obtained as hard colorless crystals (4.3 g., 51 per cent, M. P. Ca, 355°.

Analysis: Calc'd for $C_{20}H_{23}NCl_2$: Cl, 20.36. Found: Cl, 20.24.

EXAMPLE 4

*4 - dimethylamino - spiro[cyclohexane - 1,9'-fluorene]hydrochloride*

4.96 g. (0.02 mole) of spiro[cyclohexanone-4,9'-fluorene], 7.3 g. (0.1 mole) of dimethylformamide and 9.2 g. (0.2 mole) of 98–99% formic acid were heated under reflux for 30 minutes and most of the excess formic acid was distilled off. The residue was heated under reflux for 1½ hours until a clear solution resulted. The material was then subjected to distillation until the temperature of the distillate reached 170°. The residue was then heated under reflux at 175° for three hours. The reaction mixture was heated to boiling with 200 ml. of 2N hydrochloric acid, filtered and the residue was again extracted with 200 ml. of 2N hydrochloric acid. On cooling the combined acid extracts the amine hydrochloride crystallized. This weighed 5.3 g. Recrystallization from a mixture of methanol and isopropanol gave colorless crystals which melted at 295–96°.

Analysis: Calc'd for $C_{20}H_{24}NCl$: Cl, 11.30. Found: Cl, 11.29.

EXAMPLE 5

*Spiro[cyclohexane-1,9'-flourene]-4-trimethylammonium chloride*

4-dimethylamino-spiro[cyclohexane-1,9'-fluorene] hydrochloride (11.5 g.) and a solution of 10 g. of sodium hydroxide in 100 ml. of water was mixed and warmed with shaking. The mixture was cooled and the oily amine was taken up in 300 ml. of ether. The ether extract was dried over calcium chloride, and the solvent was removed by distillation. The almost colorless solid amine which remained as the residue (6.0 g.) was sealed in a Carius tube (the tube was cooled in a Dry Ice-acetone bath) with about 20 ml. of methyl chloride. The amine dissolved and the quaternary ammonium salt began to separate out almost at once. The mixture soon solidified and was allowed to stand over night. The crude salt was taken up in a hot mixture of methanol and isopropanol. The solution was clarified with Norite and allowed to cool. The colorless spiro[cyclohexane-1,9'-fluorene] - 4 - trimethylammonium chloride amounted to 3.2 g., M. P. ca. 290° (with decomposition).

Analysis: Calc'd for $C_{21}H_{26}NCl$: Cl, 10.81. Found: Cl, 10.85.

EXAMPLE 6

By substituting other suitable reactants for those shown in the preceding examples, the following representative derivatives of spiro[cyclohexanone-4,9'-fluorene] have been prepared:

4-amino-spiro[cyclohexane-1,9'-fluorene]hydrochloride having a melting point of 326–7° C. This compound was prepared from spiro[cyclohexanone-4,9'-fluorene] and formamide in accordance with the procedure of Example 1.

Analysis: Calc'd for $C_{18}H_{20}NCl$: Cl, 12.41. Found: Cl, 12.27.

4-methylamino-spiro[cyclohexane - 1,9' - fluorene]hydrochloride, having a melting point of 287–8° C. This compound was prepared from spiro[cyclohexanone-4,9'-fluorene] and methylamine in accordance with the procedure of Example 2.

Analysis: Calc'd for $C_{19}H_{22}NCl$: Cl, 11.83. Found: Cl, 11.65.

4-(N-piperidyl) - spiro[cyclohexane-1,9'-fluorene]hydrochloride with a melting point of ca. 345° C. This compound was prepared from spiro[cyclohexanone-4,9'-fluorene] and N-formyl-piperidine in accordance with the procedure of Example 1.

Analysis: Calc'd for $C_{23}H_{28}NCl$: Cl, 10.02. Found: Cl, 9.98.

We claim:

1. A compound of the class consisting of a free base and salts thereof, said free base having the formula

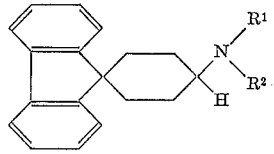

wherein $R^1$ is selected from the group consisting of H, lower alkyl, and chloro and hydroxy substituted lower alkyl, $R^2$ is selected from the group consisting of H and lower alkyl, and wherein $R^1$ and $R^2$ may be joined to form a six-membered saturated hetero monocyclic radical.

2. 4-(N-morpholinyl) - spiro[cyclohexane-1,9'-fluorene].

3. 4 - dimethylamino - spiro[cyclohexane-1,9'-fluorene].

4. 4-amino-spiro[cyclohexane-1,9'-fluorene].

5. 4 - methylamino - spiro[cyclohexane - 1,9'-fluorene].

6. 4 - (N-piperidyl) - spiro[cyclohexane - 1,9'-fluorene].

DALE A. STAUFFER.
OTIS E. FANCHER.

No references cited.